United States Patent [19]
Johnson

[11] Patent Number: 5,449,151
[45] Date of Patent: Sep. 12, 1995

[54] SHOCK ABSORBER TETHER LINE

[75] Inventor: Charles A. Johnson, Perkasie, Pa.

[73] Assignee: Scott W. Millikan, Chalfont, Pa.

[21] Appl. No.: 343,098

[22] Filed: Nov. 21, 1994

[51] Int. Cl.⁶ ............................................. F16F 1/00
[52] U.S. Cl. ...................................... 267/71; 114/215;
114/249; 267/69
[58] Field of Search ..................... 267/69, 70, 71, 72,
267/73, 74, 147, 148, 149; 114/213, 215, 216,
253, 249; 278/91; 43/42.72; 280/480, 483;
294/74, 82.11; 54/34; 119/795, 797, 798, 769;
244/1 TD

[56] References Cited

U.S. PATENT DOCUMENTS

| 187,510 | 2/1877 | Carrol | 267/70 |
|---|---|---|---|
| 189,986 | 4/1877 | Armstrong | 267/70 |
| 194,448 | 8/1877 | Duc | 267/69 |
| 444,006 | 1/1891 | Mason | 267/71 |
| 492,560 | 2/1893 | Scarborough | 267/69 |
| 644,186 | 2/1900 | Roberts | 267/69 |
| 707,388 | 8/1902 | Chaffin | 267/71 |
| 1,609,900 | 12/1926 | Bishop | 267/70 |
| 1,643,588 | 9/1927 | Ratigan | 267/70 |
| 2,119,834 | 6/1938 | Thompson | 267/71 |
| 3,357,694 | 12/1967 | Kidder et al. | 267/70 |
| 4,378,750 | 4/1983 | Holzhauer | 114/249 |
| 4,757,979 | 7/1988 | Essex | 267/71 |
| 5,026,230 | 6/1991 | Dolezych et al. | 410/100 |
| 5,066,059 | 11/1991 | Egbert et al. | 294/82.16 |

FOREIGN PATENT DOCUMENTS

| 485954 | 6/1917 | France | 267/71 |
|---|---|---|---|
| 194944 | 6/1907 | Germany | 267/70 |
| 657566 | 3/1938 | Germany | 280/488 |
| 4035780 | 11/1990 | Germany | 267/70 |
| 6937 | 4/1993 | United Kingdom | 267/70 |

Primary Examiner—Douglas C. Butler
Attorney, Agent, or Firm—John J. Simkanich

[57] ABSTRACT

A shock absorber is incorporated into a tether line to provide a take up device for adjusting the effect of certain instantaneous stress forces in the tether line. This shock absorber is formed as part of an assembly and is positioned in transverse orientation to the longitudinal axis of the tether, to control a designated payout of the tether itself. The tether remains as one continuous lineal structure. The shock absorber, while operating on lineal stress forces in the tether, does not become a necessary support link of the tether. The tether may be of flexible line and the shock absorber structure is comparatively compact, thereby allowing the flexible tether line to be coiled and easily stored without the removal of the shock absorber mechanism. Upon reuse, care is not needed for orientation of the shock absorber, as stress is applied to the tether line.

12 Claims, 2 Drawing Sheets

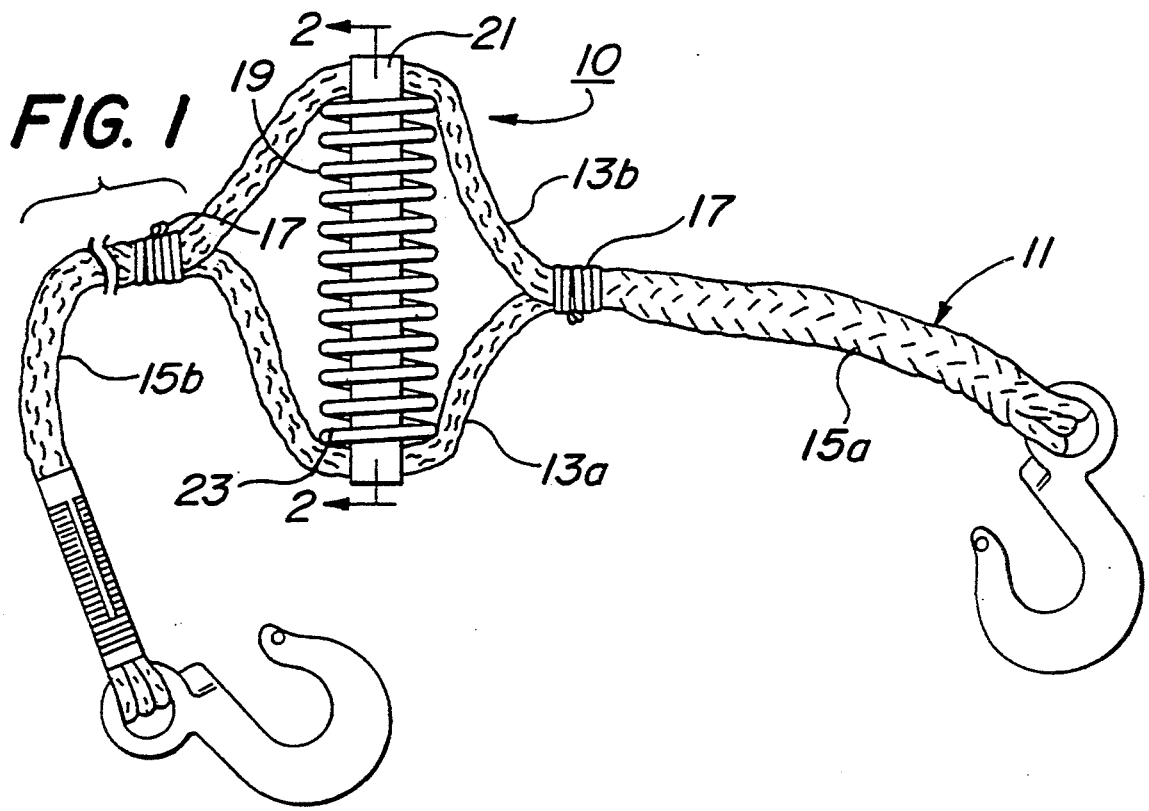
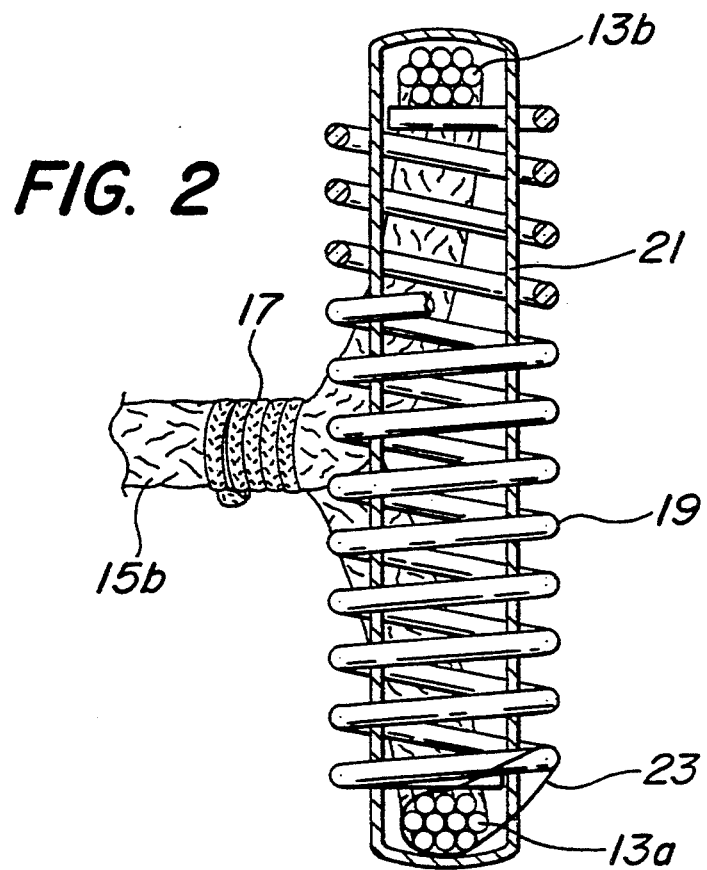

SHOCK ABSORBER TETHER LINE

BACKGROUND OF THE INVENTION

The present invention is directed to spring couplings for ropes, cables and tether lines; and is specifically directed to an assembly for such a rope, cable and tether line assembly which incorporates a shock absorber.

Coil springs have been incorporated into band assemblies, cable assemblies, and tow line assemblies for some time. In each instance, their purpose has been to ameliorate shock forces introduced into the band, cable or line and to regulate tension forces. Of the numerous designs in the prior art, T. J. Carroll, U.S. Pat. No. 187,510, and F. Armstrong, U.S. Pat. No. 189,986, have both provided coil spring bands. E. P. Bishop, U.S. Pat. No. 1,609,900, and M. A. Rose, Fr. 485,954, show coil take up structures for tow lines. J. D. Essex, U.S. Pat. No. 4,757,979, has provided a tension regulating apparatus for a chain-type cable J. F. Chaffin has provided an elastic connection for check rains.

In each of the above designs, the line, cable or chain is broken or separated, and the spring device operates as a connector or coupler between two sections. This remains true even with the more recent spring coupling structures of B. Stoter, DE (Germany) 4,035,780, U. Dolezych, U.S. Pat. No. 5,026,230, and G. L. Egbert et al., U.S. Pat. No. 5,066,059. In these devices, the spring (coupler) structure, must out of necessity, include: a housing; a spring mechanism; and either a coupling loop or clamp or line knot or chain link, for connecting each mating tether section to the interposed spring device (coupler). In the prior art, the spring devices are all very rigid. They often are significantly heavier than the tether. They present large cumbersome structures to the user of the tether. Their components must be properly realigned as tension is applied to the tether. Moreover, as each of these devices requires the tether to be broken into two sections, and each device is a necessary link in the tether and must be tested and approved or certified to the load bearing and tensile strength rating of the tether itself.

What is desirable is to develop an improved spring device for a tether line which will act as a shock absorber; which does not require a distinct separation of the tether into two sections; and is relatively light weight, reasonably cumbersome in respect to the tether, and maintains its operating orientation when the tether is pressed into service after coiling or storage.

SUMMARY OF THE INVENTION

An object of the present invention is to provide a shock absorber tether line assembly, which in comparison to the tether line itself, is of similar weight and complementary flexibility.

A second object of the present invention is to provide this shock absorber tether line assembly which does not interrupt the continuous length of the tether.

A further object of the present invention is to provide this shock absorber tether line assembly which remains in operating orientation upon reuse following storage and/or coiling of the tether line.

The objects of the invention are realized in an assembly structured as part of the continuous length of a flexible tether line. This assembly structure includes a bifurcated section formed in the continuous length of the flexible line. This bifurcated section is formed by joining a double length of line or by braiding two parallel running legs within a length of braided line.

A biasing means separates the two legs of the bifurcated section of the line in an orthogonal direction and operates therein between. As tension is applied to the tether line, the stress in the line is also present in the two legs. This stress force acts against the biasing means therein moving, compressing or deforming the biasing means, whereof the two legs move together, thereby longitudinally paying out a length of the line.

Preferably, this biasing means is of compact structure, comparably light weight, and fixedly oriented with respect to the two legs of the line. This fixed orientation remains throughout coiling, storing and use of the line. The biasing means may be implemented with a resilient structure, such as a coil spring, which by its inherent configuration, operates as a motion and force dampening device, i.e. a shock absorber.

A keeper structure is connected between the two legs of the line and functions to keep the biasing means, coil spring or otherwise, within the confines of the two legs and orthogonal to the longitudinal operating direction of the line.

DESCRIPTION OF THE DRAWINGS

The features, advantages and operation of the shock absorber tether line of the present invention will become readily apparent and further understood from a reading of the following detailed description with the accompanying drawings, in which like numerals refer to like elements, and in which:

FIG. 1 shows a braided tether line with the shock absorber assembly built into the tether line;

FIG. 2 is a cross sectional view through the spring, keeper and tether assembly of the braided tether, taken as shown in FIG. 1;

DETAILED DESCRIPTION OF THE INVENTION

Figure 3:
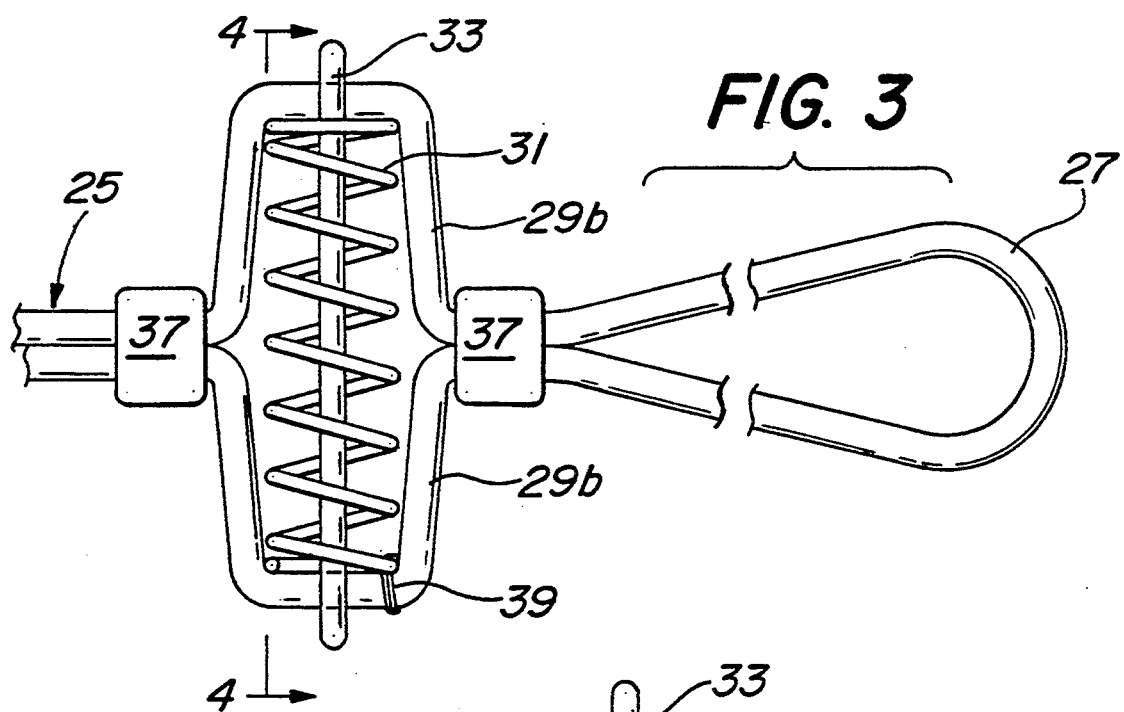
FIG. 3 is a partial view of a cable type tether line joined with clamps to form the bifurcated section within which the spring and keeper structures operate.

The present invention is shock compensating section 10, FIG. 1, for a tether line 11. This shock compensating section 10 is constructed as a continuous part of the tether line 11, does not require the tether line 11 to be broken into two sections, and does not form a necessary connection link in the load rating for the tether line 11.

The tether line 11 is a braided cable of nylon, poly propylene, steel, metal alloy or other suitable materials. The selection of materials is at the user's discretion depending upon intended use. The shock compensating section 10 operates as a the shock absorber for the tether 11 and pays out a length of tether 11 as the stresses in the tether line 11 increase. This length of line is stored as a transverse projection of line which will be further discussed below.

The tether 11 has formed in it a bifurcated, two legged section 13a, 13b. The load carrying rating of the two legs 13a, 13b are equal to or greater than the other portions 15a, 15b of the tether 11. A cable wrap or clamp 17 may be used at the unction of the two legs 13a, 13b and each of the main sections 15a, 15b of the tether 11. This cable wrap 17 reinforces the tether junction points and keeps the braids from separating. The wrap 17 can be a stand of line or wire of the same material as the tether 11.

A coil spring 19 is positioned midway in the length of the two legs 13a, 13b and extends between them in an orthogonal direction to the longitudinal axis of the tether line 11. This spring 19 forces the transverse projection of the legs 13a, 13b which shortens the working length of the tether 11 and allows for a longitudinal pay out as the coil spring 19 is compressed. The coil spring 19 is chosen with a load rating and compression performance as a function of the load rating and designed use of the tether line 11. These coil spring 19 design factors are known in the art and need not be further discussed here.

Likewise, the length of the spring 19 is determined by the length of the two legs 13a, 13b, and the amount of line 11 the shock absorber operation is to pay out. It is obvious that as the stresses in the tether 11 increase, the coil spring 19 is compressed and the initial separation of the two legs 13a, 13b is reduced. This change in shape adds to the length of the tether 11, i.e. results in a lineal pay out of line.

A keeper loop 21 extends about the outside of each leg 13a, 13b and through the inside of the coil spring 19. This keeper loop 21 is made of either a pre-shaped flat metal strap, a pre-shaped channel stock, or a flat sheet, bar stock or a rod stock which is bent to shape. This keeper loop 21 has an elongated, rectangular shaped, cross section, as shown in FIG. 2. The width and thickness of the keeper 21, as well as the materials from which it is made, will depend upon the size and intended use of the tether 11. Unlike the coil spring 19, the keeper 21 need only be strong enough to hold the spring 19 in place. However, it must also be durable enough to withstand normal use and abuse.

A tie 23 secures an end coil section of the spring 19 to a fixed position on one leg 13a. This tie 23 is made of suitable material and is used to keep the spring 19 from drifting from the midpoint of the two legs 13a, 13b.

By means of an example, the shock absorber tether line may be made as follows: the tether 11 is made of about ½ inches in diameter, stranded polypropylene cable having a tensile strength of about 3,000 pounds; the legs 13a, 13b are each about 9 inches long and each about ⅜ inches in diameter; the spring 19 is made of alloy steel and is about 4 inches long by about 1 and ¼ inches in diameter, with a spring rate of about 1500 to 2,000 pounds per inch; the keeper 21 is made of about ⅜ inches wide by about 1/16 inches thick carbon steel material which, in its cross section, forms a box channel about 5 and ⅛ inches long by about ⅜ inches wide; the wrap 17 is made of stranded poly propylene about 1/16inches in diameter and extends about ¾ inches along the line 11; and the tie 23 is made of stranded poly propylene being about 1/16 inches in diameter.

FIG. 3 shows an another embodiment of the invention. The tether line 11 is a solid steel cable 25 or a stranded jacketed cable 25. This cable 25 is doubled back on itself to form an attachment loop portion 27, and then forms two legs 29a, 29b adjacent the attachment loop portion 27. The two legs 29a, 29b, which comprises the shock absorber assembly, also includes a coil compression spring 31, a keeper ring or rod 33, and a spring position securement 35. The two lagged section is defined and held by a pair of clamps 37 or weldments.

Figure 4:
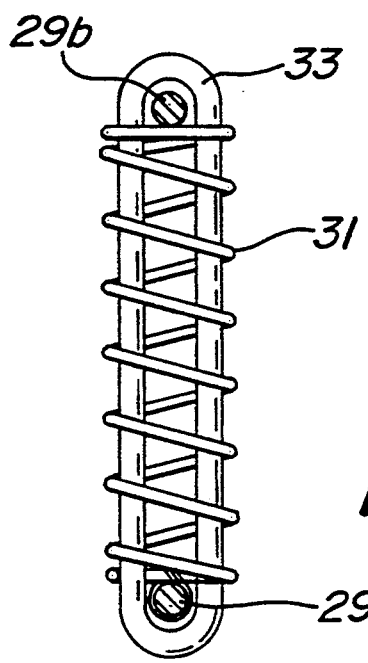
FIG. 4 shows a cross sectional view of the shock absorber section of the cable type tether line, taken as shown in FIG. 3.

The shock absorber assembly of FIG. 3 is shown in cross section in FIG. 4. Its function and operation is the same as that of the embodiment of FIGS. 1–2. However, in FIG. 4 it can be seen that the size of the closed loop ring 33 is larger than tile diameter of the wire from which the spring 31 is made. In this embodiment the ring 33 is a closed oval loop rod of softer alloy or synthetic material, while the spring 31 is made of high strength steel.

Figure 5:
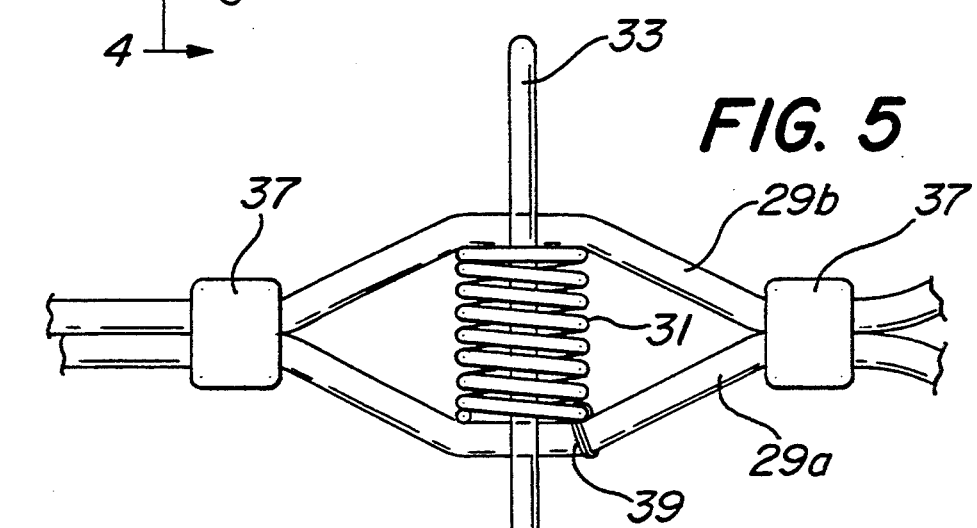
FIG. 5 is a partial view of the cable type tether line of FIG. 3 showing the spring in compression and the line paid out in length.

FIG. 5 shows the shock absorber section of FIG. 3 under tensile stress, the spring 31 compressed to its limit, and the section of the cable 25 stored in the transverse projection created by the spring 31 extending against the legs 29a, 29b paid into the linear length of the cable 25.

A tie or securement 39, which is used to hold the position of the spring 31 at the mid point of the legs 29a, 29b, is also seen in FIG. 5. This securement 39 can be either a tie, a clamp, a weldment, or other means.

The present invention provides a shock absorber assembly for a tether line which will not kink or otherwise fall apart when not in use, or when not under tension. Moreover, the user does not have to concern himself with orientation, misalignment of parts, or deflection of the shock absorber assembly, as tension is applied to the tether line. The invention can also be used for tie downs, construction cables, suppension cables on cranes, bridges and the like, towing cables and others. In fact, it can find application where a sudden increase in tension, i.e. an impulse force, needs to be controlled or otherwise compensated.

Many changes can be made in the above-described invention without departing from the intent and scope thereof. It is thereby intended that the above description be read in the illustrative sense and not in the limiting sense. Substitutions can be made in the depth and dimensions stated above and for the wear and other tolerances rendered thereby.

What is claimed is:

1. A shock absorber assembly for a flexible tether line comprising:

the tether line having a interim section of plural, initially parallel extending flexible lines integral therewith and contiguously connected therebetween to form part of the working length thereof, whereof if one of said plural lines should break the remaining lines maintain the integrity of the tether line;

a biasing structure operating to separate said plural lines in transverse directions to cause portions of said plural lines to diverge from the lineal direction of the tether line, thereby shortening the effective working length of said tether line, said biasing structure being connected to said parallel extending lines;

a keeper structure connected to said biasing structure and to at least one of said plural legs to secure said biasing structure in fixed relationship to all of said plural legs; and wherein said biasing structure opposes the collapse of said parallel extending legs with an exponential increasing force as tension is applied to said tether line.

2. The assembly of claim 1 wherein said tether line interim section of said plural, parallel extending lines is created by a bifurcation of said tether line interim section into said plural, parallel extending lines, each said plural parallel line being connected to and by between said tether line adjacent outboard portions.

3. The assembly of claim 2 wherein said biasing structure includes a coil spring connected to bias each of said plural lines outwardly, in a transverse direction, from the longitudinal operating axis of said tether line, and to resist the collapse of said transverse extension of said plural lines onto one another and into the longitudinal operating axis of said tether as tension is applied to said tether line.

4. The assembly of claim 3 wherein said keeper structure includes a closed loop member which limits the transverse extension of said plural lines and restrains the lateral movement of said spring.

5. The assembly of claim 4 wherein said keeper structure also includes a securement member fixedly attached to a position on one of said plural lines and holding a coil of said coil spring thereto.

6. The assembly of claim 1 wherein said plural lines are formed by an overlaying of plural lengths of said continuous length of tether line and attaching each between the adjacent portions of said tether line; and also including a clamp at each end of said plural lines holding said plural lines together and to said respective tether line adjacent portions at said respective meeting point.

7. The assembly of claim 1 wherein said tether line is a braided cable and said plural lines are formed as a bifurcated braided length of said braided cable.

8. The assembly of claim 7 also including a wrap about the juncture of each respective braided cable portion to said bifurcated braided legs juncture.

9. A shock absorber assembly for a tether line comprising:

the tether line having a section of plural, parallel extending legs integral therewith;

a biasing structure operating to separate said plural legs in transverse directions to the lineal direction of the tether line, thereby shortening the effective working length of said tether line, said biasing structure being connected to said parallel extending legs;

a keeper structure connected to said biasing structure and to at least one of said plural legs to secure said biasing structure in fixed relationship to all of said plural legs; and wherein said biasing structure opposes the collapse of said parallel extending legs with an exponential increasing force as tension is applied to said tether line;

wherein said biasing structure includes a coil spring connected to push each of said plural legs outwardly, in a transverse direction, from the longitudinal operating axis of said tether, and to resist the collapse of said transverse extension of said plural legs onto one another and into the longitudinal operating axis of said tether as tension is applied to said tether line;

wherein said keeper structure includes a closed loop member which limits the transverse extension of said plural legs and restrains the lateral movement of said spring;

wherein said keeper structure also includes a securement member fixedly attached to a position on one of said plural legs and holding a coil of said spring thereto; and wherein said closed loop member is an elongate rectangular cross section channel type member which extends about and outside of each said plural leg and through the center of said spring.

10. A shock absorber assembly for a tether line comprising:

the tether line having a section of plural, parallel extending legs integral therewith;

a biasing structure operating to separate said plural legs in transverse directions to the lineal direction of the tether line, thereby shortening the effective working length of said tether line, said biasing structure being connected to said parallel extending legs;

a keeper structure connected to said biasing structure and to at least one of said plural legs to secure said biasing structure in fixed relationship to all of said plural legs; and wherein said biasing structure opposes the collapse of said parallel extending legs with an exponential increasing force as tension is applied to said tether line;

wherein said biasing structure includes a coil spring connected to push each of said plural legs outwardly, in a transverse direction, from the longitudinal operating axis of said tether, and to resist the collapse of said transverse extension of said plural legs onto one another and into the longitudinal operating axis of said tether as tension is applied to said tether line;

wherein said keeper structure includes a closed loop member which limits the transverse extension of said plural legs and restrains the lateral movement of said spring;

wherein said keeper structure also includes a securement member fixedly attached to a position on one of said plural legs and holding a coil of said spring thereto; and wherein said closed loop member is an elongate ring which extends about and outside of each said plural leg and through the center of said spring.

11. The assembly of claims 6, 7 or 8 wherein said plural legs number two.

12. The assembly of claims 9 or 10 wherein said securement member is one of: a tie, a clamp, a weldment.

* * * * *